United States Patent [19]

Gord et al.

[11] 4,317,794

[45] Mar. 2, 1982

[54] PROCESS FOR THE CONTINUOUS MANUFACTURE OF FIBER-REINFORCED CELLULOSE HYDRATE TUBING AND EQUIPMENT FOR CARRYING OUT THE PROCESSES

[75] Inventors: Herbert Gord, Ingelheim; Reinhold Becker, Wiesbaden, both of Fed. Rep. of Germany

[73] Assignee: Hoechst Aktiengesellschaft, Frankfurt am Main, Fed. Rep. of Germany

[21] Appl. No.: 53,763

[22] Filed: Jul. 2, 1979

[30] Foreign Application Priority Data

Jul. 3, 1978 [DE]  Fed. Rep. of Germany ....... 2829102

[51] Int. Cl.³ ............................................. B29D 7/20
[52] U.S. Cl. ................................... 264/559; 264/557; 264/558; 264/562; 264/561; 425/71
[58] Field of Search ............... 264/557, 558, 559, 562, 264/561; 425/71

[56] References Cited

U.S. PATENT DOCUMENTS

| | | | |
|---|---|---|---|
| 2,016,841 | 10/1935 | Smith | 264/562 |
| 2,070,247 | 2/1937 | Weingand | 264/562 |
| 2,144,900 | 1/1939 | Smith | 93/94 |
| 2,401,773 | 6/1946 | Reichel | 264/558 |
| 2,910,380 | 10/1959 | Shiner | 117/66 |
| 3,005,728 | 10/1961 | Bridgeford | 117/118 |
| 3,392,073 | 7/1968 | Schenk | 156/203 |
| 3,600,488 | 8/1971 | Yazawa | 264/95 |
| 3,645,760 | 2/1972 | O'Brien | 99/176 |
| 4,164,536 | 8/1979 | Bentley | 264/173 |
| 4,195,054 | 3/1980 | Verellen | 264/558 |

FOREIGN PATENT DOCUMENTS 1174046 12/1969 United Kingdom .
1336850 11/1973 United Kingdom .

Primary Examiner—Paul R. Michl
Attorney, Agent, or Firm—Schwartz, Jeffery, Schwaab, Mack, Blumenthal & Koch

[57] ABSTRACT

Disclosed is a process for the continuous manufacture of fiber-reinforced tubing based on cellulose hydrate, comprising the steps of impregnating and coating fibrous tubing with an aqueous akaline viscose solution; moving the viscose-treated tubing at a steady speed vertically in a straight line along its longitudinal axis; applying a viscose-regenerating fluid along at least one circular circumferential line to at least the outside of the viscose-treated fibrous tubing; immediately after the application step, passing the tubing with the film of regenerating fluid on its surface through at least one first air section, whereby there is produced a fiber-reinforced tubing based on cellulose hydrate; treating the cellulose hydrate tubing with an aqueous fluid containing a dissolved chemical plasticizer; and drying the plasticized tubing. Also disclosed is an apparatus for carrying out this process.

13 Claims, 1 Drawing Figure

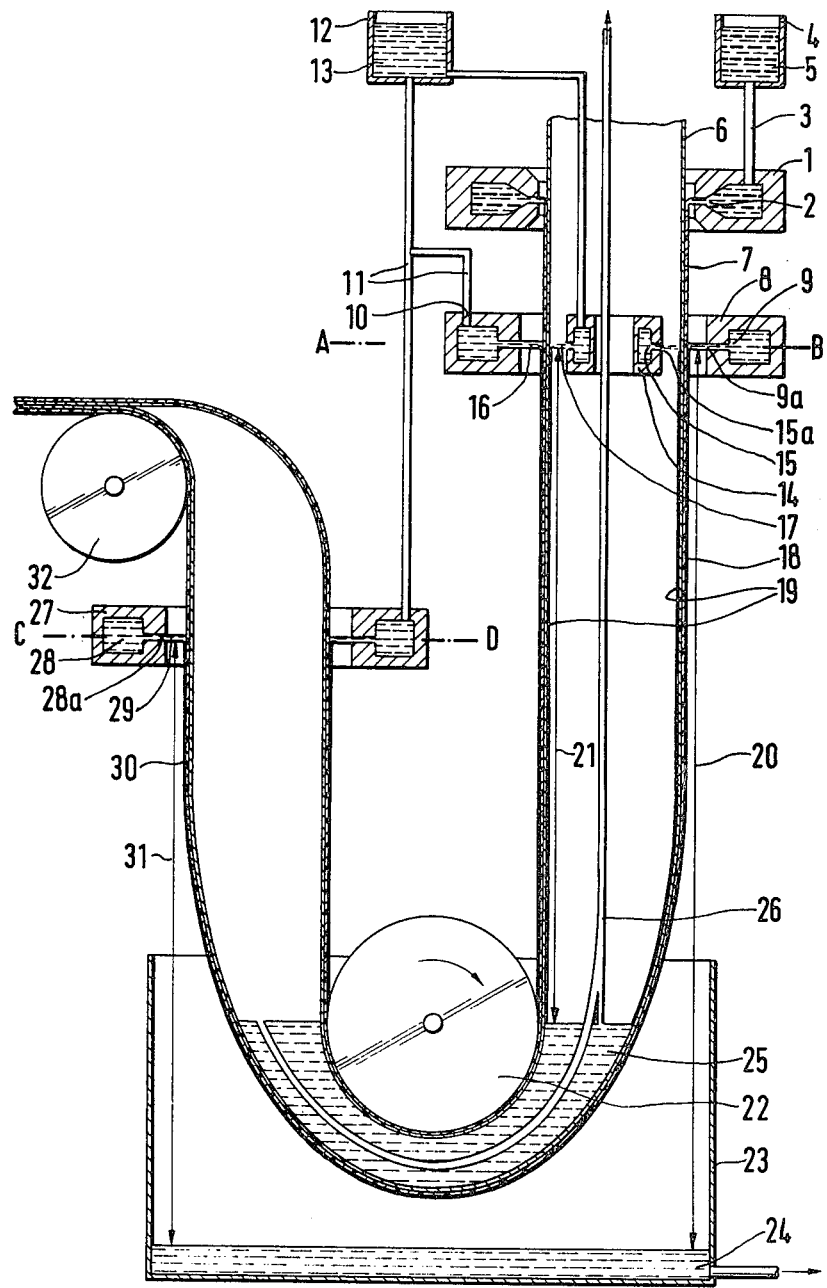

PROCESS FOR THE CONTINUOUS MANUFACTURE OF FIBER-REINFORCED CELLULOSE HYDRATE TUBING AND EQUIPMENT FOR CARRYING OUT THE PROCESSES

BACKGROUND OF THE INVENTION

The present invention relates to processes for the continuous manufacture of fiber-reinforced tubing based on cellulose hydrate, in which fibrous tubing impregnated and coated with aqueous alkaline viscose solution is continuously coated on the surface thereof with a film of regenerating fluid, and the regenerating fluid forming the film causes a coagulation of the viscose and its chemical conversion into cellulose hydrate.

The invention also relates to equipment for carrying out the processes.

The use of the products, which can be manufactured by the processes according to the invention, as packaging material, in particular as artificial sausage casings, is a further subject of the invention.

In the known processes for the manufacture of fiber-reinforced cellulose hydrate tubing, the fibrous tubing, to the outside of which viscose solution has been applied by means of an annular die and which has thus been impregnated and coated with viscose solution, is passed through a trough of sufficiently long dimensions, which is filled with regenerating fluid. In the bottom of the trough, rotatably mounted guide rolls are provided. The tubing on immersion into the trough filled with regenerating fluid is first deflected into a horizontal orientation with the aid of the first guide roll and then is deflected into a vertical orientation by the second guide roll, after which it is passed out of the trough again. The application is here carried out in such a way that initially a certain quantity of regenerating fluid is enclosed within the cavity of the tubing to which it is to be applied.

During the period in which the tubing runs through the regenerating fluid present in the trough, the surface of the tubing is in direct contact with a large quantity of regenerating fluid, and there is no substantial relative movement between this fluid and the wall of the viscose-treated fibrous tubing which is moved along the longitudinal axis.

In the known processes, the regenerating fluid is continuously fed into the cavity of the tubing on the underside of the take-off roll and is extracted on the side of the spinning die below the spinning die, so that there is always largely spent stagnant regenerating agent in the ascending part of the tubing. The regenerating agent acting on the outside of the tubing has a substantially uniform concentration. The concentration of the regenerating fluid acting on the outside of the tubing is, however, lower than that in the cavity of the tubing in order to ensure a circular cross-section of the tubing.

Gases formed during the process of coagulating and regenerating the viscose by the action of the regenerating fluid rise as gas bubbles both in the regenerating fluid in the cavity of the tubing and in the regenerating fluid present in the trough. These gas bubbles are extracted and diluted with air above the surface of the regenerating fluid.

The disadvantages of the known processes are thus the following:

1. The concentration of solute in the regenerating fluid acting on the inside of the tubing must be greater than that on the outside of the tubing.

2. To ensure an optimum course of coagulation during the action of the regenerating fluid on the viscose solution, the regenerating fluid must contain the solute in relatively small quantities in order to avoid undesired secondary phenomena which readily occur if the coagulation is excessively fast—for example vigorous gas evolution.

3. To remove the gases formed during the coagulation process in the deswelling water, the cavity of the tubing must be slit open at an undesired frequency in order to be able to discharge the said media therefrom; such slitting of the tubing is undesirable because it leads to an interruption in the course of the process and to undesired slits in the tubing which must be secured together again.

4. There is virtually no relative movement between the surface of the tubing and the quantity of regenerating fluid adjacent thereto at a particular time.

5. Because of the relatively large volume of regenerating fluid in the trough, a change in the sulfuric acid concentration of the regenerating fluid can be attained only after a relatively long time.

6. Due to unavoidable fluctuations in production, such as the tubing tearing off and the like, the concentration of the regenerating fluid in the trough must be readjusted relatively frequently since the more highly concentrated regenerating fluid present in the cavity of the tubing passes into that present in the bath and leads in the latter to a higher concentration of solute in the fluid.

SUMMARY OF THE INVENTION

It is therefore an object of the present invention to provide an improved continuous process for the manufacture of fiber-reinforced tubing based on cellulose hydrate.

A further object of the invention resides in providing such a process which avoids the known disadvantages, permits simplified production at higher speeds for coating and impregnating the fibrous tubing with viscose solution, enables chemical substances formed during the process, such as carbon disulfide and hydrogen sulfide, to be removed in a simple manner, allows simple guiding of the tubing during the coagulation process and avoids the necessity of frequent slitting of the tubing for the removal of gases and fluids from the cavity of the tubing.

Another object of the invention resides in the provision of improved apparatus for carrying out the process according to the invention.

In accomplishing the foregoing objects, there has been provided in accordance with the present invention a process for the continuous manufacture of fiber-reinforced tubing based on cellulose hydrate, comprising the steps of impregnating and coating fibrous tubing with an aqueous alkaline viscose solution; moving the viscose-treated tubing at a steady speed vertically in a straight line along its longitudinal axis; applying a viscose-regenerating fluid along at least one circular circumferential line to at least the outside of the viscose-treated fibrous tubing; immediately after the application step, passing the tubing with the film of regenerating fluid on its surface through at least one first air section, whereby there is produced a fiber-reinforced tubing based on cellulose hydrate; treating the cellulose hydrate tubing with an aqueous fluid containing a dissolved chemical plasticizer; and drying the plasticized tubing. Preferably, the process is carried out continuously and involves continuously applying regenerating fluid simultaneously to the outside and inside of the viscose-treated fibrous tubing, in each case along a circular circumferential line.

In accordance with another aspect of the present invention there has been provided an apparatus for carrying out the above-described process. The apparatus comprises means including a circular die body having an annular gap, for continuously impregnating and coating a moving fibrous tubing with aqueous alkaline viscose solution; and first means positioned downstream (in the direction of tubing movement) of the die body for applying viscose-regenerating fluid to the viscose-treated fibrous tubing. This applying means preferably comprises means including at least a first element of circular cross-section, for applying regenerating fluid in the form of a circular circumferential line to at least one surface of the tubing. The element of circular cross-section preferably comprises a hollow cylindrical jacket having a circular gap terminating on the inside of the jacket in the jacket wall. The apparatus preferably further comprises means, including a cylinder having a circular gap ending on the periphery of the cylinder, for applying viscose-regenerating fluid in the form of a circular line to the inside of the viscose-treated fibrous tubing. Most preferably, the cylinder is arranged concentrically with said circular element, with their longitudinal axes aligned. The apparatus includes an open space downstream of the viscose-regenerating fluid application means, forming an air space wherein the tubing to which the viscose-regenerating fluid has been applied is permitted to contact the air for a predetermined period of time.

Further objects, features and advantages of the invention will become apparent from the following detailed description of preferred embodiments, when considered together with the attached figures of drawing.

BRIEF SUMMARY OF THE DRAWING

The drawing schematically illustrates an apparatus for carrying out the process according to the present invention.

DETAILED DESCRIPTION OF PREFERRED EMBODIMENTS

The fibrous tubing impregnated and coated with viscose solution is designated in this application as "viscose-treated fibrous tubing".

The term "fibrous tubing" designates tubing of fiber material in a random tangled arrangement, in particular tubing of paper fibers. Fibrous tubing preferred according to the process is made of long-fibered paper.

The manufacture of fibrous tubing from fiber webs with the aid of known forming devices, so-called folding plates, is known per se and does not represent a subject of the present invention; the latter likewise does not relate to the manufacture of viscose tubing.

The preparation of suitable viscose solutions is described, for example, in U.S. Pat. No. 3,280,234, the disclosure of which is incorporated by reference herein.

The impregnation and coating, known per se, of fibrous tubing with viscose solution, is effected with the aid of annular die bodies, such as are described, for example, in British Pat. No. 1,336,850, the disclosure of which is also incorporated by reference herein.

The essential measures of the process comprise continuously applying regenerating fluid along at least one circular line to at least one surface of a viscose-treated fibrous tubing which is moved at a steady speed vertically downwardly in a straight line along its longitudinal axis and, immediately after the application of regenerating agent, passing the viscose-treated fibrous tubing, provided with a film of regenerating fluid on its surface, through at least one air section. In the zone of the air section, the action of the regenerating fluid, forming the fluid film, takes place on the substrate in the shape of the viscose-treated fibrous tubing. The total period of action of a section of regenerating fluid film of certain dimensions on a corresponding section of the viscose-treated fibrous tubing, during the passage of the latter through the entire particular air section, depends in each case on the total length thereof and on the particular speed at which the viscose-treated fibrous tubing moves forward. As a result of the action of the regenerating fluid, the viscose solution impregnating and coating the fibrous tubing is coagulated and thus chemically converted into cellulose hydrate. Gases and liquid thus formed are taken up and removed by excess regenerating fluid running off the surface of the tubing. Excess fluid which contains liquid and gases in part formed during the regenerating process and which runs off the outside of the viscose-treated fibrous tubing to which regenerating fluid has been applied, is collected in a trough and can be returned again to the process circulation after a treatment, if desired.

Excess fluid which runs off the inside of the viscose-treated fibrous tubing to which regenerating fluid has been applied is continuously extracted from the cavity of the tubing and can be returned again to the process circulation after a corresponding treatment. Excess regenerating fluid running off the surface of the viscose-treated fibrous tubing contains swelling water formed partially during the regeneration procedure as well as gases formed.

It is also possible, in carrying out the process, to draw the viscose-treated fibrous tubing over or through a straight and, if appropriate, hollow cylindrical mandrel as a calibrating device.

Due to the high volumetric flows of regenerating fluid on the outside of the tubing and, if appropriate, at the same time on the inside of the tubing, the gases formed during the coagulation and regeneration of the viscose as a result of the action of the regeneration agent are entrained in the film of regenerating fluid on the surface of the tubing so that these can be extracted in a concentrated form in a degassing vessel, as a result of which an exit air purification unit works more efficiently. If desired, the viscose-treated fibrous tubing to which regenerating fluid has been applied can, after passing through the air section, undergo a renewed application of regenerating fluid along a further circular line—preferably on its outside—for the purpose of a more rapid or more complete coagulation and regeneration of the viscose to give cellulose hydrate. This second action of regenerating agent here is preferably effected in the part of the tubing on an ascending course after the tubing has been deflected by a guide roll positioned at the bottom of a collecting trough for regenerating fluid which drips off the outside of the tubing.

The second application to the outside of the tubing is followed by a further air section which extends downwardly from the circular line, that is to say, opposite to the direction of forward motion of the tubing.

Advantageously, the process is carried out in such a way that, after the application of regenerating fluid and after passing through the air section, the viscose-treated fibrous tubing is deflected by a guide roll in such a way that following the guide roll it moves vertically in the upward direction. Fluid which collects in the cavity of the tubing in the region of the bend in the tubing is continuously extracted, simultaneously in the descending and ascending parts of the tubing, through lines each of which ends just below the liquid level which is to be maintained.

Equipment according to the invention comprises a circular body known per se with an annular gap ending on the inside thereof for continuously impregnating and coating fibrous tubing, which passes at a steady speed through the cavity thereof, with viscose solution, and at least one element of circular cross-section and with a circular gap ending at its periphery, for applying regenerating fluid to at least one surface of the viscose-treated fibrous tubing. In a preferred embodiment, the equipment comprises two elements, each of circular cross-section, with an annular gap for continuous application to both the outside and inside of the viscose-treated fibrous tubing, in each case along a circular line. The element used for application to the outside of the viscose-treated fibrous tubing has the shape of a hollow cylinder—called jacket below—and the jacket having in its wall an annular gap which ends on the inside of the jacket. The element used for applying regenerating fluid to the inside of the viscose-treated fibrous tubing consists of a cylinder which has a circular gap ending in its peripheral wall.

In place of the said elements for applying regenerating fluid to the viscose-treated fibrous tubing, it is also possible to use spray nozzles which are to be regarded, according to the definition, as elements of circular cross-section. The spray nozzles are likewise capable of applying regenerating fluid to viscose-treated fibrous tubing along circular lines.

A preferred embodiment of the equipment comprises a circular die body with a circular gap for impregnating and coating the fibrous tubing with viscose solution, a circular element in the form of a hollow cylindrical jacket with a circular gap in its wall ending on the inside of the jacket for applying regenerating fluid to the outside of the viscose-treated fibrous tubing along a circular line, and an element in the form of a cylinder with a circular gap ending on its periphery for application to the inside of the viscose-treated fibrous tubing along a circular line. The elements are in such a mutual spacial arrangement that their straight longitudinal axes of symmetry are aligned, with the alignment being in a vertical plane.

The elements used for applying regenerating fluid to the viscose-treated fibrous tubing are here arranged below (as viewed in the direction of downward movement of the tubing) the die body for impregnating and coating the fibrous tubing with viscose solution.

In a preferred embodiment of the equipment, the elements for applying coating fluid are utilized, without adjustment screws, for adjusting the thickness of the circular gaps since, in this way, an undesired readjustment of the width of the die gap is prevented.

The elements which are used for applying regenerating fluid to the viscose-treated fibrous tubing and which have a circular gap are designed in such a way that identical pressure conditions and hence equal distribution and uniform emergence of the regenerating fluid from its outlet orifices in each case are ensured by holding chambers in the die gaps.

The term "circular line" for one zone of the surface in each case of the viscose-treated fibrous tubing moved at a steady speed vertically forward in a straight line along its longitudinal axis, within which zone regenerating fluid is continuously applied to the tubing, designates in each case an annular very narrow zone of the surface of the tubing, the width of which is so small relative to the circumference of the tubing that it can be described as virtually linear.

The "circular line" as defined can be regarded as the impact line of regenerating fluid onto the surface of the viscose-treated fibrous tubing.

The term "air section" is used for straight vertical sections of travel, each of defined length, which are in each case immediately adjacent to circular impact lines of regenerating fluid onto the surface of the viscose-treated fibrous tubing. Through each of these "air sections" pass immediately successive sections of defined dimensions of viscose-treated fibrous tubing which are provided on the surface with a thin film of regenerating fluid and which move forward in a straight vertical line at constant speed. Within the air section, the outside of the film of regenerating fluid on the surface of the viscose-treated fibrous tubing is exclusively bounded by a gaseous medium. Vapors and/or gas mixtures, which are saturated with fluid and are located in the cavity of the tubing, are here likewise designated as a gaseous medium.

According to its function, the air section represents a zone within which the viscose impregnating and coating the fibrous tubing is, by the action of the regenerating fluid which is in the form of the liquid film on the surface thereof, in each case coagulated and chemically converted into cellulose hydrate to a sufficient extent, that is to say, the chemical conversion into cellulose hydrate of the viscose impregnating and coating the fibrous tubing takes place during the total period of action of the film of regenerating fluid on the substrate in the zone of the air section. The length of the particular air section, to be selected in an individual case, depends on the speed of forward movement of the tubing and on the rates of regenerating fluid emerging per unit time from the outlet orifice of the gap at a defined height of the elements for application to the viscose-treated fibrous tubing and applied to the surface thereof in the zone of the impact lines, and on the qualitative and quantitative chemical composition of the fluid, its temperature as well as the temperature of the surrounding air.

The total length of the air section is thus to be set in each case in such a way that, within the air section, a sufficiently complete coagulation of the viscose and conversion into cellulose hydrate take place. If appropriate, e.g., if the air section must be made very short for reasons of the construction of the apparatus, a renewed application of regenerating fluid to the tubing can take place along a further circular line which is then followed again by an air section. The corresponding characteristic data for fixing air sections suitable for the individual case can be determined in a simple manner and by a few preliminary experiments.

The film of regenerating fluid on the surface of the viscose-treated fibrous tubing can be regarded as built up from a very large number of integral circular zones of regenerating fluid, which are materially connected to one another and which each communicate with one another without transition in the zone of their front faces and have been formed by the continuous application of regenerating fluid along a circular line to the surface of the tubing moved forward at a steady speed.

In a preferred embodiment of the process, the continuous application of regenerating fluid along a circular line to the viscose-treated fibrous tubing passing downwardly at a steady speed in a vertical straight line along its longitudinal axis is effected at least once on the outside of the viscose-treated fibrous tubing and simultaneously along a circular line on the inside thereof, the circular lines being arranged concentrically relative to one another. The said preferred process variant can be carried out in a particularly advantageous embodiment in such a way that the two circular lines extend in a common horizontal plane which forms a right angle with the straight longitudinal axis of the tubing.

According to a variant of the preferred process, the two circular lines can also each extend in horizontal planes which run parallel at a distance from one another and in each case form a right angle with the straight longitudinal axis of the tubing.

The circular element with an annular gap for continuously applying regenerating fluid to the outside of the viscose-treated fibrous tubing advantageously consists of a hollow cylindrical jacket, for example of metal, the wall of which has a circular gap which extends in the jacket wall in a plane which forms a right angle to the longitudinal axis of the jacket. The gap has an outlet orifice on the inside of the jacket.

In the jacket wall, a bore is provided which leads from its outside to the gap and through which the regenerating fluid can be introduced into the cavity of the gap and can be pressed out of the outlet orifice thereof.

If desired, the equipment is designed in such a way that a cylindrical counter-body of corresponding dimensions, which also acts simultaneously as a calibrating element for the viscose-treated fibrous tubing passed through the cavity, is provided in the cavity of the jacket, i.e., centrally arranged. The jacket body and, if appropriate, the cylindrical body provided in its cavity are each fastened in a fixed position by means of suitable holder devices.

For the intended use of the circular element with an annular die gap for application to the outside of the viscose-treated fibrous tubing along a circular line, the tubing is passed through the cylindrical cavity of the jacket, centrally in the cavity thereof and downwardly in a straight vertical line along its longitudinal axis. The diameter of the jacket cavity is thus dimensioned so that it is adapted at least to the external diameter of the viscose-treated fibrous tubing plus the thickness of the film of regenerating fluid which is to be applied to the outside of the tubing.

While the process is being carried out, the fibrous tubing or the viscose-treated fibrous tubing is in a state inflated with air, as a result of supporting air being present in its cavity.

The cylinder, which is used if desired and is arranged and fixed in the cavity of the viscose-treated fibrous tubing as a counter-element to the ring body with an annular gap or as a calibrating element, has a diameter which is only a little smaller than the internal diameter of the viscose-treated fibrous tubing.

The annular cavity between the inside of the jacket and the outside of the cylinder is also called the "tubing passage".

In the preferred embodiment of the process, according to which regenerating fluid is applied simultaneously to both the outside and the inside of the viscose-treated fibrous tubing, in each case along circular lines, a cylinder which is located and fastened in a fixed position within the cavity of the viscose-treated fibrous tubing and has a circular gap which extends in a plane forming a right angle to the longitudinal axis of the cylinder and ends in the peripheral surface of the cylinder, is used for applying regenerating fluid to the inside of the viscose-treated fibrous tubing.

The cylinder has a bore which leads from its front face to the cavity of the gap and through which regenerating fluid can be introduced into the cavity so that it can be pressed out of its outlet orifice. The outer ends of the bores can be and are in each case connected by pipes or hoses to a stock container for regenerating fluid.

For carrying out the preferred process variant in a particularly advantageous embodiment, the equipment is preferably designed in such a way that the jacket with a circular gap and the cylinder with a circular gap are arranged concentrically with one another in such a way that their longitudinal axis of symmetry are aligned and their circular gaps extend in a common horizontal plane which forms a right angle to the longitudinal axis of the tubing to which regenerating fluid is to be applied.

The regenerating fluid which continuously emerges from the outlet orifices of the gaps of the said elements here impinges on both the outside and the inside of the viscose-treated fibrous tubing moved forward at a steady speed.

The annular channel between the inside of the jacket and the outside of the cylinder is dimensioned so that is corresponds at least to the thickness of the viscose-treated fibrous tubing plus in each case the thickness of the films of regenerating fluid, to be formed on the surface thereof.

The fibrous tubing to be treated with viscose is guided concentrically through the annular passage channel.

In the preferred process mode, it is advantageous if the regenerating fluids which come to act on both the outside and the inside of the viscose-treated fibrous tubing have the same qualitative and quantitative chemical formulation. Suitable regenerating fluids for coagulating viscose from aqueous alkaline viscose solutions and for chemically converting it into cellulose hydrate have been described and comprise, for example, aqueous solutions which contain dissolved ammonium sulfate, sodium sulfate and sulfuric acid. The quantitative chemical formulation of the regenerating fluid, suitable for the particular individual case, can be determined in a simple manner by a few preliminary experiments. The use of regenerating fluid for regenerating cellulose hydrate from viscose solutions is not per se a subject of the present invention. Moreover, the invention does not involve any particular chemical composition of the regenerated fluid.

During the period when regenerating fluid is applied to the viscose-treated fibrous tubing by the process according to the invention and when the viscose-treated fibrous tubing provided with a liquid film of regenerating fluid on its surface is passed through air sections, the tubing is inflated with air. For this purpose, supporting air is introduced in a known manner into the cavity of the tubing.

In the following text, the preferred embodiment for carrying out the process according to the invention is described by way of an illustrative example.

In a known manner, fibrous tubing is continuously formed by longitudinally and overlappingly folding a fiber web provided in sufficient length and adequate width, for example, a web of paper. The overlapped edges are bonded with viscose solution in a manner known per se with the aid of known devices, and this can be effected in a known manner simultaneously with the continuous impregnation and coating of the fibrous tubing.

Devices for simultaneously impregnating and coating fibrous tubing with viscose solution are conventional.

When coating and impregnating a fibrous tubing with viscose solution, the tubing is continuously drawn off a stock roll and passed at a steady speed downwardly in a straight vertical line along its longitudinal axis through the annular tubing passage of the circular die for treating with viscose and is thus continuously impregnated and coated with viscose solution.

The application of regenerating fluid to the viscose-treated fibrous tubing takes place locally (as viewed downwardly in the direction of forward movement of the tube) after the fibrous tubing has been treated with viscose.

The viscose-treated fibrous tubing is here (without changing its spatial arrangement) passed concentrically through the annular passage space which is formed by the inside of the hollow cylindrical jacket having an annular gap and the outside of the cylinder having a circular gap.

An adequate amount of regenerating fluid is continuously fed from supply vessels to each of the gaps in the said elements for applying regenerating liquid to the viscose-treated fibrous tubing; this fluid always steadily emerges from the outlet orifices of the gaps. The regenerating fluid emerging in each case from the outlet orifices of the gaps here impinges along a circular line on the surface of the viscose-treated fibrous tubing which is moved past the outlet orifices of the gaps at a constant speed, and continuously coats this surface with a thin film of regenerating fluid.

The viscose-treated fibrous tubing to which regenerating fluid has been applied and which has, on its outside, and preferably also on its inside, a film of regenerating fluid, which is thin as compared with its wall thickness, is then passed immediately after the application (without a change of its spatial arrangement) at a predetermined speed through air sections of appropriately selected length.

If it is desired to shorten the length of the air section without reducing the coagulation effect of the film of regenerating fluid in the zone thereof, the process is advantageously carried out in such a way that the air section is placed into a heating tunnel, with the viscose-treated fibrous tubing which is provided on its surface with a film of regenerating fluid running through the tunnel. The heating tunnel can, for example, be subjected to warm air of adequate temperature, or the heat desired in the heating tunnel is generated by heat sources which are provided in the heating tunnel and emit infra-red radiation.

As soon as a section of defined length of viscose-treated fibrous tubing which has been provided on its surface with a film of regenerating fluid has in each case run through the entire length of the air section at a defined speed, the viscose has then been coagulated and converted into cellulose hydrate by the action of the regenerating agent.

The thus formed fiber-reinforced tubing based on cellulose hydrate is then passed, advantageously with partial flattening, around at least one and preferably several guide rolls which are arranged successively with the axes of each running parallel to one another, and is after-treated in a manner known per se. The after-treatment consists in washing the fiber-reinforced tubing based on cellulose hydrate, for example, by passing it through a trough filled with water and then causing a chemical plasticizer to act thereon, for example, by passing it through a trough which contains the aqueous solution of a chemical plasticizer, e.g., aqueous glycerol solution, and then drying the tubing, for example, by passing it through a drying channel of appropriate temperature.

If desired, the dried fiber-reinforced tubing based on cellulose hydrate is moistened with water, for example, by spraying, in order to adjust it to a defined final water content, for example, a water content of about 10% by weight, relative to the total weight of the tubing.

The steps of washing the tubing with water, subjecting it to the action of a solution containing a plasticizer, drying the tubing and re-moistening it are conventional measures which form part of the state of the art.

When carrying out the process in the preferred manner described, it is advantageous to provide, at the end of the air section below the first rotatably mounted guide roll, a trough for collecting excess regenerating fluid which runs off the outside of the tubing. The fluid which has run off the tubing and collects in the receiver trough can, if necessary, be worked up and reintroduced into the process circulation.

Excess fluid which runs off the inside of the viscose-treated fibrous tubing to which regenerating fluid has been applied, collects upstream of the guide roll in the cavity of the fiber-reinforced tubing of cellulose hydrate and is continuously pumped out of the latter in a known manner by means of known devices. The fluid pumped out can, if necessary, be returned again to the circulation after working-up.

The manner in which the preferred process variant described is carried out can also be modified in such a way that regenerating fluid is again applied along a circular line to the outside of the tubing after it has run through the air section, and the tubing is then passed through a further air section.

The renewed application of regenerating fluid to the outside of the tubing takes place here after the tubing has passed the first guide roll and subsequently moves upwardly in a straight vertical line along its longitudinal axis. The renewed application of regenerating fluid along a circular line to the outside of the tubing in the ascending part thereof is effected by means of an element for applying regenerating fluid, which element is constructed in a manner corresponding to that used for the first application to the outside of the viscose-treated fibrous tubing and is employed here in the same manner as the latter. The second air section follows the second application to the outside of the tubing along a circular line and extends downwardly from the latter, as viewed in the upward direction of movement of the ascending part of tubing. The after-treatment of the tubing is effected analogously to the treatment explained above.

In the description, the term "axis" is used in the sense of "geometric axis".

The manner of fixing the elements of the equipment to certain holder devices is not explained in more detail in the description since this is not essential to the invention, and furthermore, fastening elements of this type form part of the state of the art.

In the drawing, a circular die body 1 is provided with an annular gap 2 for coating and impregnating the fibrous tubing 6 of circular cross-section with viscose-solution 5. Line 3 connects a supply vessel 4 for the viscose solution 5 to the annular die body 1 via a bore in the latter. The viscose-treated fibrous tubing 7 is in the state of circular cross-section, inflated with air, and a hollow cylindrical jacket 8 in its wall has a circular gap 9 with an outlet orifice 9a on the inside of the jacket. Through bore 10 in the wall of the jacket and, to the outside of the wall, line 11, regenerating fluid 13 passes from supply vessel 12 into the circular gap 9 in the jacket 8. A cylinder 14 is located in the cavity of the viscose-treated fibrous tubing 7 inflated with air and has the circular gap 15 with the outlet orifice 15a on its peripheral surface. The regenerating fluid 16 emerges from the outlet orifice 9a of the circular gap 9 in the jacket 8. The regenerating fluid which emerges from the circular gap 15 of the cylinder 14 out of the outlet orifice 15a thereof is designated by reference numeral 17 and is fed thereto from the supply vessel 12 via the line 11. Reference numeral 18 designates the film of regenerating fluid on the outside of the viscose-treated fibrous tubing, and 19 is the film on its inside. Air section 20 on the outside of the viscose-treated fibrous tubing to which regenerating fluid has been applied, and air section 21 is on its inside. Guide roll 22 is located in the trough 23 in a rotatable mounting and around it is guided the tubing which is moved forward in the direction of the arrow at a steady speed with partial flattening. Excess fluid 24 has run off the outside of the viscose-treated fibrous tubing to which regenerating fluid has been applied, and excess fluid 25 has run off the inside of the viscose-treated fibrous tubing, to which regenerating fluid has been applied, and collects in the cavity of the tubing. The latter fluid can be pumped out of the cavity of the tubing through the lines 26. Hollow cylinder 27 has a circular gap 28 located in the wall thereof and an outlet orifice 28a on the inside thereof. Reference numeral 29 designates regenerating fluid 13 which emerges from the outlet orifice 28a of the circular gap 28 and is fed to the latter via the line 11 from the supply vessel 12. Reference numeral 30 denotes a film of regenerating fluid on the outside of the tubing, and 31 denotes further air sections.

The dotted-and-dashed straight line A–B represents that horizontal plane which extends at a right angle to the longitudinal axis of the tubing and in which the circular gap 9 of the jacket 8 and the circular gap 15 of the cylinder 14 and at the same time also the impingement lines, corresponding thereto, of regenerating fluid all commonly extend.

The circular gap 28 in the wall of the hollow cylinder 27 and the impingement line, corresponding thereto, of regenerating fluid extend in the horizontal plane C–D. A second roll 32, arranged in a rotatable mounting, serves for deflecting the tubing after the renewed application of regenerating fluid to its outside.

For the sake of simplifying the drawing, the manner of preparation and equipment for the formation of fibrous tubing by overlappingly folding of a fiber web are not represented and, likewise, the further treatment of the fiber-reinforced tubing of cellulose hydrate by passing the latter through washing baths and through a fluid containing chemical plasticizers, as well as the subsequent drying of the tubing, also are not shown.

The holding devices required for the arrangement in a fixed position of the illustrated constructional elements of the equipment are likewise not shown.

What is claimed is:

1. A process for the continuous manufacture of fiber-reinforced tubing based on cellulose hydrate, comprising the steps of impregnating and coating fibrous tubing with an aqueous alkaline viscose solution; moving the viscose-treated tubing at a steady speed vertically in a straight line along its longitudinal axis; applying a film of viscose-regenerating fluid along at least one circular circumferential line to at least the outside of the viscose-treated fibrous tubing; immediately after the application step, passing the tubing with the film of regenerating fluid on its surface through at least one first air section, whereby there is produced a fiber-reinforced tubing based on cellulose hydrate; treating the cellulose hydrate tubing with an aqueous fluid containing a dissolved chemical plasticizer; and drying the plasticized tubing.

2. A process as claimed in claim 1, wherein said application step is carried out continuously.

3. A process as claimed in claim 2, which comprises continuously applying regenerating fluid simultaneously to the outside and inside of the viscose-treated fibrous tubing, in each case along a circular circumferential line.

4. A process as claimed in claim 2, which comprises continuously applying said regenerating fluid to at least the outside of the tubing, after it has run through the first air section, and then passing it through a second air section.

5. Apparatus for carrying out the process as claimed in claim 1, comprising:
   means including a circular die body having an annular gap, for continuously impregnating and coating a moving fibrous tubing with aqueous alkaline viscose solution;
   first means positioned downstream (in the direction of tubing movement) of said die body for applying viscose-regenerating fluid to the viscose-treated fibrous tubing, said applying means comprising means including at least a first element of circular cross-section, for applying a film of viscose-regenerating fluid along at least one circumferential line to at least one surface of the viscose-treated fibrous tubing; and
   means for transporting the viscose- and regenerating fluid-treated fibrous tubing in a vertical direction past said applying means.

6. Apparatus as claimed in claim 5, wherein said element of circular cross-section comprises a hollow cylindrical jacket having a circular gap terminating on the inside of the jacket in the jacket wall.

7. Apparatus as claimed in claim 6, further comprising means, including a cylinder having a circular gap ending on the periphery of the cylinder, for applying viscose-regenerating fluid in the form of a circular line to the inside of the viscose-treated fibrous tubing.

8. Apparatus as claimed in claim 7, wherein said cylinder with a circular gap is arranged concentrically with said circular element with their longitudinal axes aligned.

9. Apparatus as claimed in claim 8, wherein said cylinder is located at least in part within the cylindrical cavity of the cylindrical jacket, whereby there is formed between the peripheral surface of the cylinder and the inside of the circular element an annular cavity adapted for passage of the viscose-treated fibrous tubing to which regenerating fluid is to be applied.

10. Apparatus as claimed in claim 9, further comprising an open space downstream of said viscose-regenerating fluid application means forming an air space wherein the tubing to which the viscose-regenerating fluid has been applied is permitted to contact the air for a predetermined period of time.

11. Apparatus as claimed in claim 10, further comprising second means, positioned downstream of said open space, for applying viscose-regenerating fluid to at least one side of the tubing after it exits from the open space, said second applying means comprising means, including a second element of circular cross-section, for applying regenerating fluid in the form of a circular circumferential line to the surface of the tubing.

12. A process as claimed in claim 4, wherein the tubing is conveyed downwardly while the regenerating fluid is applied prior to said first air section and the tubing is conveyed upwardly while the regenerating fluid is applied after said first air section.

13. A process as claimed in claim 3, wherein the concentration of the regenerating fluid applied to the inside of said tubing is approximately the same as that of the regenerating fluid applied to the outside of the tubing.

* * * * *